US011248759B2

(12) United States Patent
Gao

(10) Patent No.: US 11,248,759 B2
(45) Date of Patent: Feb. 15, 2022

(54) PANEL LAMP

(71) Applicant: ACEVEL LIGHTING (GZ) CO., LTD, Guangzhou Guangdong (CN)

(72) Inventor: Meiqin Gao, Guangzhou Guangdong (CN)

(73) Assignee: ACEVEL LIGHTING (GZ) CO., LTD, Guangzhou Guangdong (CN)

( * ) Notice: Subject to any disclaimer, the term of this patent is extended or adjusted under 35 U.S.C. 154(b) by 4 days.

(21) Appl. No.: 16/938,295

(22) Filed: Jul. 24, 2020

(65) Prior Publication Data

US 2020/0355332 A1 Nov. 12, 2020

Related U.S. Application Data

(63) Continuation of application No. PCT/CN2019/114225, filed on Oct. 30, 2019.

(30) Foreign Application Priority Data

Jan. 29, 2019 (CN) .......................... 201910087370.6

(51) Int. Cl.
 *F21S 4/00* (2016.01)
 *F21S 4/28* (2016.01)
 (Continued)

(52) U.S. Cl.
 CPC . *F21S 4/28* (2016.01); *F21S 8/03* (2013.01);
   *F21V 7/00* (2013.01); *F21V 17/12* (2013.01);
 (Continued)

(58) Field of Classification Search
 CPC ....... F21S 4/28; F21S 8/00; F21S 8/03; F21V 2200/20; F21V 7/04; F21V 17/12; F21V 17/16; F21V 19/003; F21V 1/12; F21V 21/005; F21V 7/0016; F21Y 2115/10; G02B 6/0078; G02B 6/0063; G02B 6/0076; G02B 6/0068; G02B 6/0055;
 (Continued)

(56) References Cited

U.S. PATENT DOCUMENTS

| 6,309,081 | B1 * | 10/2001 | Furihata | ............... G02B 6/0091 |
| | | | | 349/65 |
| 8,096,671 | B1 * | 1/2012 | Cronk | ................... E04B 9/0428 |
| | | | | 362/147 |
| 2006/0262521 | A1 * | 11/2006 | Piepgras | ................. F21V 29/83 |
| | | | | 362/149 |

(Continued)

*Primary Examiner* — Omar Rojas Cadima
(74) *Attorney, Agent, or Firm* — Foley & Lardner LLP

(57) ABSTRACT

A panel lamp includes a lamp frame, light bars, an upper light diffusing plate, an upper light guiding plate, a lower light guiding plate, a lower light diffusing plate and a middle optical isolation element. The lamp frame includes at least three frame bars successively connected, each provided with an installation groove. Each installation groove is internally provided with one lamp bar, each light bar is provided with an upper lamp body and a lower lamp body. The upper light diffusing plate, upper light guiding plate, middle optical isolation element, lower light guiding plate and lower light diffusing plate are snap-fitted in the installation grooves. The upper lamp body faces a side edge of the upper light guiding plate, and the lower lamp body faces a side edge of the lower light guiding plate. The middle optical isolation element is between the upper lamp body and the lower lamp body.

7 Claims, 10 Drawing Sheets

(51) Int. Cl.
  *F21S 8/00* (2006.01)
  *F21V 7/00* (2006.01)
  *F21V 17/12* (2006.01)
  *F21V 17/16* (2006.01)
  *F21V 19/00* (2006.01)
  *F21V 23/00* (2015.01)
  *F21Y 115/10* (2016.01)

(52) U.S. Cl.
  CPC ............ *F21V 17/16* (2013.01); *F21V 19/003* (2013.01); *F21V 23/003* (2013.01); *F21V 2200/20* (2015.01); *F21Y 2115/10* (2016.08)

(58) Field of Classification Search
  CPC ............ G02F 1/133342; G02F 1/1336; H05K 2201/10106
  See application file for complete search history.

(56) References Cited

U.S. PATENT DOCUMENTS

| | | | |
|---|---|---|---|
| 2010/0220497 A1* | 9/2010 | Ngai | G02B 6/002 362/610 |
| 2011/0149596 A1* | 6/2011 | Lv | G02B 6/0073 362/607 |
| 2012/0155114 A1* | 6/2012 | Kim | G02B 6/0023 362/607 |
| 2014/0218965 A1* | 8/2014 | Kim | G02B 6/0075 362/607 |
| 2014/0241008 A1* | 8/2014 | Kim | F21V 5/007 362/615 |
| 2015/0059219 A1* | 3/2015 | Remenda | G09F 13/18 40/518 |
| 2017/0162547 A1* | 6/2017 | Bergmann | H01L 33/62 |
| 2018/0128965 A1* | 5/2018 | Ross | B29C 39/10 |
| 2019/0196086 A1* | 6/2019 | Schenkl | F21V 15/01 |

* cited by examiner

PANEL LAMP

CROSS-REFERENCE TO RELATED PATENT APPLICATIONS

The present application is a Continuation of International Application No. PCT/CN2019/114225, filed Oct. 30, 2019, which claims the benefit of and priority to Chinese Patent Application No. 201910087370.6, filed Jan. 29, 2019. The entire disclosures of International Application No. PCT/CN2019/114225 and Chinese Patent Application No. 201910087370.6 are incorporated herein by reference.

BACKGROUND

The present invention relates to a technical field of illumination technology, and specifically to a panel lamp.

Panel lamps, as a kind of indoor illumination appliance, are designed to be simple, have an attractive appearance, and can form an effect of uniform planar light emitting. This kind of panel lamp has good illuminance uniformity, and has gentle, comfort and bright light. It also has a broad application.

The panel lamp in prior art only can emit light from one side to the ground. However, currently, there is a need for some decorated places to emit light to the ground and emit a portion of the light upwards simultaneously, in order to improve illuminative effect.

The traditional practice in the prior art is to install a light fixture irradiating upwards above the panel lamp, which increases the cost and is inconvenient for installation.

SUMMARY

An exemplary embodiment relates to a panel lamp that comprises a lamp frame, lamp bars, an upper light diffusing plate, an upper light guiding plate, a lower light guiding plate, a lower light diffusing plate and a middle optical isolation element. A lamp frame installation space is provided in a central portion of the lamp frame, and the lamp frame comprises at least three frame bars successively connected around the lamp frame installation space. Each frame bar has an installation groove on a side of the frame bar facing the lamp frame installation space. Each installation groove is internally arranged with one lamp bar. An upper lamp body and a lower lamp body located below the upper lamp body are provided on each lamp bar. The upper light diffusing plate, the upper light guiding plate, the middle optical isolation element, the lower light guiding plate and the lower light diffusing plate are snap-fitted in the installation grooves. The upper lamp body faces a side edge of the upper light guiding plate, and the lower lamp body faces a side edge of the lower light guiding plate. The middle optical isolation element is between the upper lamp body and the lower lamp body, and between the upper light guiding plate and the lower light guiding plate. The upper light diffusing plate is located above the upper light guiding plate, and the lower light diffusing plate is located below the lower light guiding plate.

DETAILED DESCRIPTION

Figure 1:
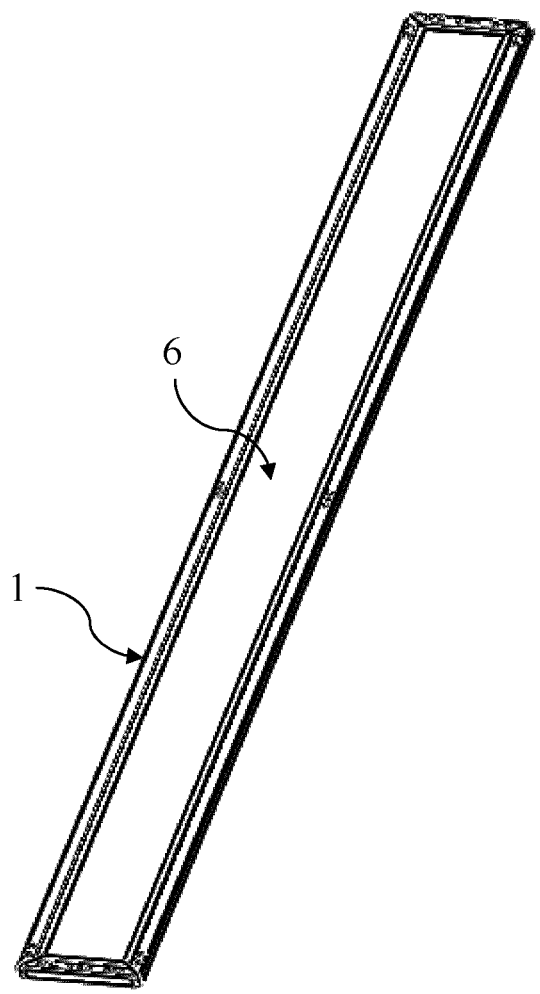
FIG. 1 is a perspective view of a panel lamp provided by a first embodiment of the invention.
Figure 2:
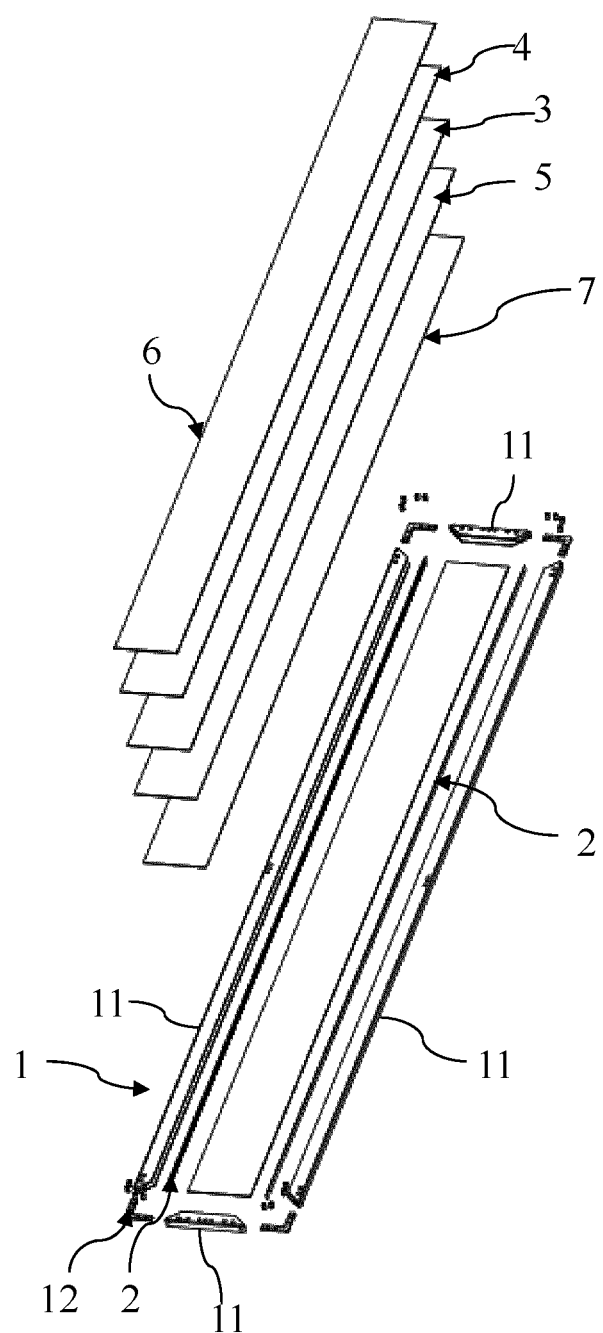
FIG. 2 is an explosive view of the panel lamp shown in FIG. 1.

Embodiments of the present invention are further described below with reference to the Figures. Wherein, the same reference numeral denotes the same part. It should be noted that, terms as used in the following description, "front", "rear", "left", "right", "up" and "down" indicate a direction in the Figures, and terms "inner" and "outer" respectively indicate the direction towards or away from a geometric center of a particular part.

An exemplary embodiment relates to a panel lamp which can emit light upwards and downwards.

The technical solution of the invention provides a panel lamp, comprising a lamp frame, lamp bars, an upper light diffusing plate, an upper light guiding plate, a lower light guiding plate, a lower light diffusing plate and a middle optical isolation element, wherein, a lamp frame installation space is provided in a central portion of the lamp frame, which comprises at least three frame bars successively connected around the lamp frame installation space;

each frame bar has an installation groove on a side of the frame bar facing the lamp frame installation space;

each installation groove is internally provided with one lamp bar;

an upper lamp body and a lower lamp body located below the upper lamp body are provided on each lamp bar;

the upper light diffusing plate, the upper light guiding plate, the middle optical isolation element, the lower light guiding plate and the lower light diffusing plate are snap-fitted in the installation grooves;

the upper lamp body faces a side edge of the upper light guiding plate, and the lower lamp body faces a side edge of the lower light guiding plate.

the middle optical isolation element is arranged between the upper lamp body and the lower lamp body, and between the upper light guiding plate and the lower light guiding plate; and the upper light diffusing plate is located above the upper light guiding plate, and the lower light diffusing plate is located below the lower light guiding plate.

Further, the middle optical isolation element comprises an upper partition located on a side close to the upper light guiding plate and a lower partition located on a side close to the lower light guiding plate.

Further, the middle optical isolation element comprises an upper reflective sheet and a lower reflective sheet; and a reflective face of the upper reflective sheet faces the upper light guiding plate, and a reflective face of the lower reflective sheet faces the lower light guiding plate.

Further, the lamp bar comprises a circuit board;

the upper lamp body comprises a plurality of upper beads arranged on the circuit board at intervals; and the lower lamp body comprises a plurality of lower beads arranged on the circuit board at intervals.

Further, there is an upper bead separation distance between any two adjacent upper beads, and there is a lower bead separation distance between any two adjacent lower beads;

wherein, the upper bead separation distance is bigger than the lower bead separation distance;

and each upper bead is located above the lower beads along a height direction of the circuit board; and each upper bead is arranged between two adjacent lower beads along a length direction of the circuit board.

Further, a control unit is also comprised, which comprises an upper lamp body control unit for controlling on-off of the upper lamp body and a lower lamp body control unit for controlling on-off of the lower lamp body; and the upper lamp body control unit is electrically connected to the upper lamp body, and the lower lamp body control unit is electrically connected to the lower lamp body.

Further, a color temperature controller electrically connected to the upper lamp body and lower lamp body respectively is also comprised.

Further, two ends of each frame bar both have a frame bar ramp, and the ends of each frame bar having frame bar ramp all have a frame bar connection groove;

two adjacent frame bars are connected by a frame bar connection element;

the frame bar connection element comprises two connection element connection ends, one being inserted into the frame bar connection groove of one frame bar and connected with this frame bar by screws, the other being inserted into the frame bar connection groove of other frame bar and connected with this frame bar by the screws; and the frame bar ramps of two adjacent frame bars are butted together.

Further, the lamp frame is L-shaped, and comprises a first frame bar, a second frame bar, a third frame bar, a fourth frame bar, a fifth frame bar and a sixth frame bar;

the second frame bar is parallel to the third frame bar, and the first frame bar is connected between the second frame bar and the third frame bar;

two ends of the first frame bar are respectively connected to the second frame bar and the third frame bar by the frame bar connection elements;

the fifth frame bar is parallel to the sixth frame bar, and the fourth frame bar is connected between the fifth frame bar and the sixth frame bar;

two ends of the fourth frame bar are respectively connected to the fifth frame bar and the sixth frame bar by the frame bar connection elements;

the second frame bar is connected to the sixth frame bar by the frame bar connection element, and the third frame bar is connected to the fifth frame bar by the frame bar connection element; and the second frame bar and the sixth frame bar, and the third frame bar and the fifth frame bar are connected by a fastener respectively.

Further, the fastener comprises a fastener body capable of transmitting light, a first connection end and a second connection end are oppositely provided at an end of the fastener body, and a third connection end and a fourth connection end are oppositely provided at other end of the fastener body;

the first connection end is parallel to the third connection end, and the second connection end is parallel to the fourth connection end; and the first connection end is connected with the second frame bar, the third connection end is connected with the third frame bar, the second connection end is connected with the sixth frame bar, and the fourth connection end is connected with the fifth frame bar.

The above technical solutions have the following advantageous effects:

in the panel lamp provided in the present invention, the lamp bar is provided with the upper lamp body facing the side edge of the upper light guiding plate and the lower lamp body facing the side edge of the lower light guiding plate, and the middle optical isolation element is arranged between the upper and lower light guiding plates, such that the panel lamp can emit light upwards and downwards separately or simultaneously, and can be applied to various places, facilitate installation, and reduce the cost.

As shown in FIGS. 1-8, a panel lamp provided by an embodiment of the invention comprises a lamp frame 1, lamp bars 2, an upper light diffusing plate 4, an upper light guiding plate 6, a lower light guiding plate 5, a lower light diffusing plate 7 and a middle optical isolation element 3.

A lamp frame installation space 10 is provided in a central portion of the lamp frame 1, which comprises at least three frame bars 11 successively connected around the lamp frame installation space 10.

Each installation groove 111 is internally provided with one lamp bar 2.

An upper lamp body 22 and a lower lamp body 23 located below the upper lamp body 22 are provided on each lamp bar 2.

The upper light diffusing plate 6, the upper light guiding plate 4, the middle optical isolation element 3, the lower light guiding plate 5 and the lower light diffusing plate 7 are snap-fitted in the installation grooves 111.

The upper lamp body 22 faces a side edge of the upper light guiding plate 4, and the lower lamp body 23 faces a side edge of the lower light guiding plate 5.

The middle optical isolation element 3 is arranged between the upper lamp body 22 and the lower lamp body 23, and between the upper light guiding plate 4 and the lower light guiding plate 5.

The upper light diffusing plate 6 is located above the upper light guiding plate 4, and the lower light diffusing plate 7 is located below the lower light guiding plate 5.

That is, the lamp frame 1 of the panel lamp is mainly consisted of more than three frame bars 11, and the central portion of the lamp frame 1 is the lamp frame installation space 10 for installing the light diffusing plates and the light guiding plates.

An inner side of each frame bar 11 has the installation groove 111, the groove opening of which faces the lamp frame installation space 10.

The lamp bars 2 are arranged in the installation grooves 111. The upper lamp body 22 and the lower lamp body 23 are provided on the lamp bars 2.

The panel lamp further comprises the middle optical isolation element 3, the upper light guiding plate 4, the lower light guiding plate 5, the upper light diffusing plate 6 and the lower light diffusing plate 7.

The light guiding plates are used to direct the light out of a light source. The light diffusing plates are used to diffuse the light to uniformly distribute the brightness of the light.

Peripheral edges of the middle optical isolation element 3, the upper light guiding plate 4, the lower light guiding plate 5, the upper light diffusing plate 6 and the lower light diffusing plate 7 are all embedded into the installation grooves 111.

Wherein, the middle optical isolation element 3 is arranged between the upper lamp body 22 and the lower lamp body 23 to separate the light of the upper lamp body 22 from the light of the lower lamp body 23.

The side edge of the upper light guiding plate 4 is aligned with the upper lamp body 22, that is, the upper lamp body 22 faces the upper light guiding plate 4, such that the light is directed out of the upper lamp body 22 through the upper light guiding plate 4. The upper light diffusing plate 6 is located above the upper light guiding plate 4 and is used to uniformly diffuse out the light conducted by the upper light guiding plate 4.

The side edge of the lower light guiding plate 5 is aligned with the lower lamp body 23, that is, the lower lamp body 23 faces the lower light guiding plate 5, such that the light is directed out of the lower lamp body 23 through the lower light guiding plate 5. The lower light diffusing plate 7 is located below the lower light guiding plate 5 and is used to uniformly diffuse out the light conducted by the lower light guiding plate 5.

Thus, in the panel lamp provided in the invention, the lamp bars 2 are provided with the upper lamp body 22 facing the side edge of the upper light guiding plate 4 and the lower lamp body 23 facing the side edge of the lower light guiding plate 5, and the middle optical isolation element 3 is arranged between the upper and lower light guiding plates, such that the panel lamp can emit light upwards and downwards separately or simultaneously, and can be applied to various places, facilitate installation, and reduce the cost.

Figure 3:
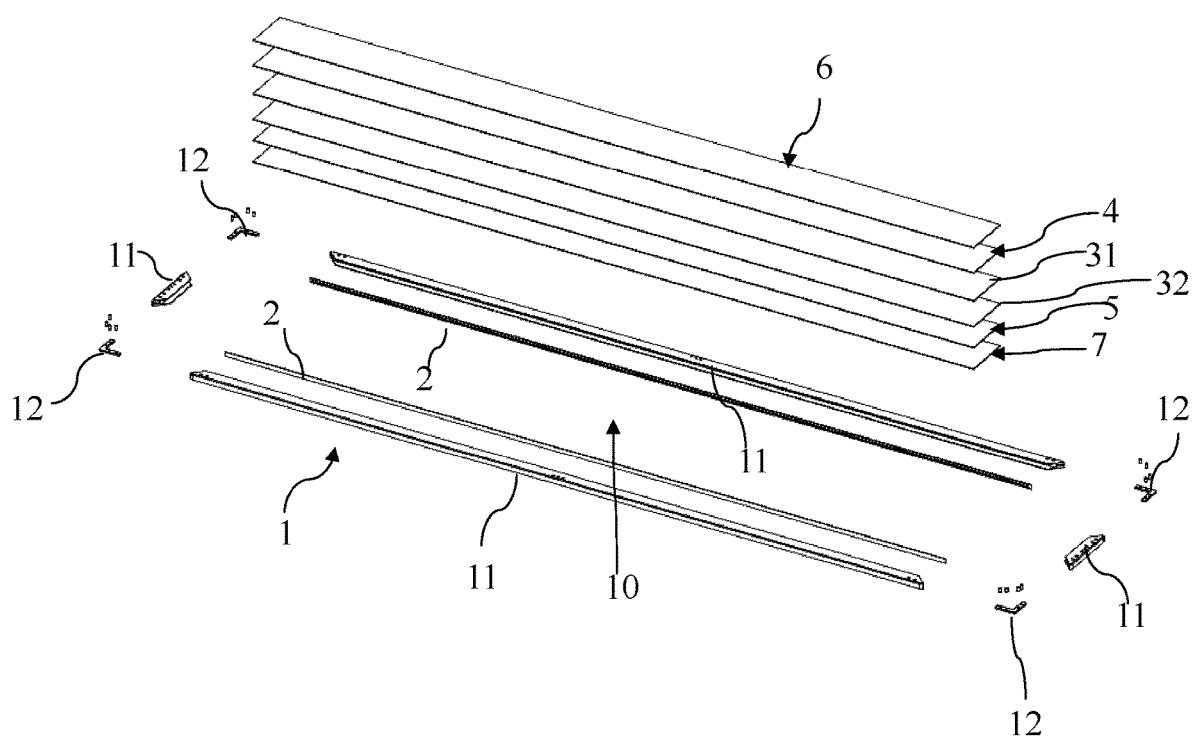
FIG. 3 is an explosive view of a panel lamp provided by a second embodiment of the invention.

Preferably, as shown in FIG. 3, the middle optical isolation element 3 comprises an upper partition 31 located on the side close to the upper light guiding plate 4 and a lower partition 32 located on the side close to the lower light guiding plate 5.

The upper partition 31 is used to block the light from the upper lamp body 22 and diffuse the light towards the upper light guiding plate 4 side. The lower partition 32 is used to block the light from the lower lamp body 23 and diffuse the light towards the lower light guiding plate 5 side.

Figure 5:
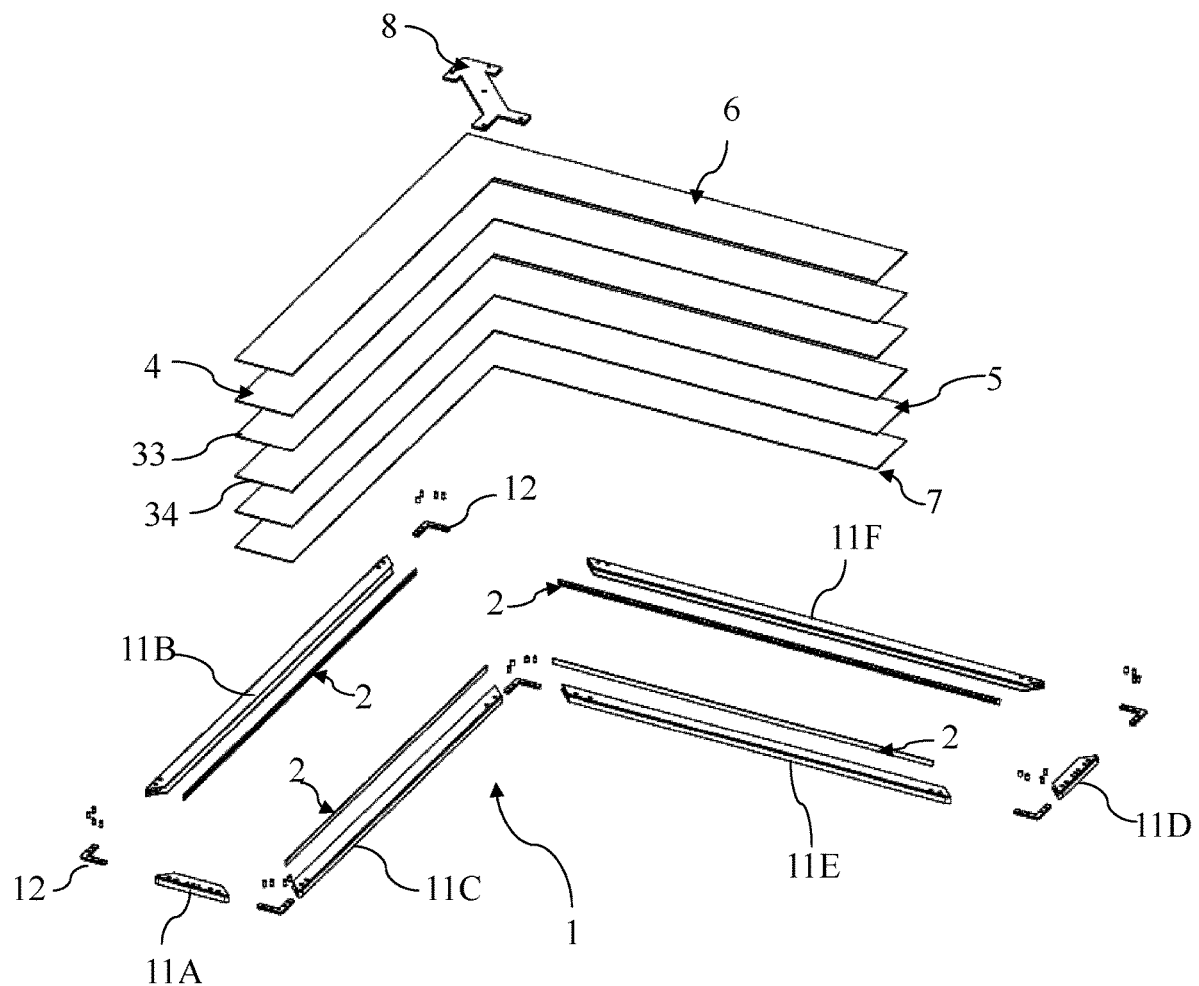
FIG. 5 is an explosive view of the panel lamp shown in FIG. 4.
Figure 6:
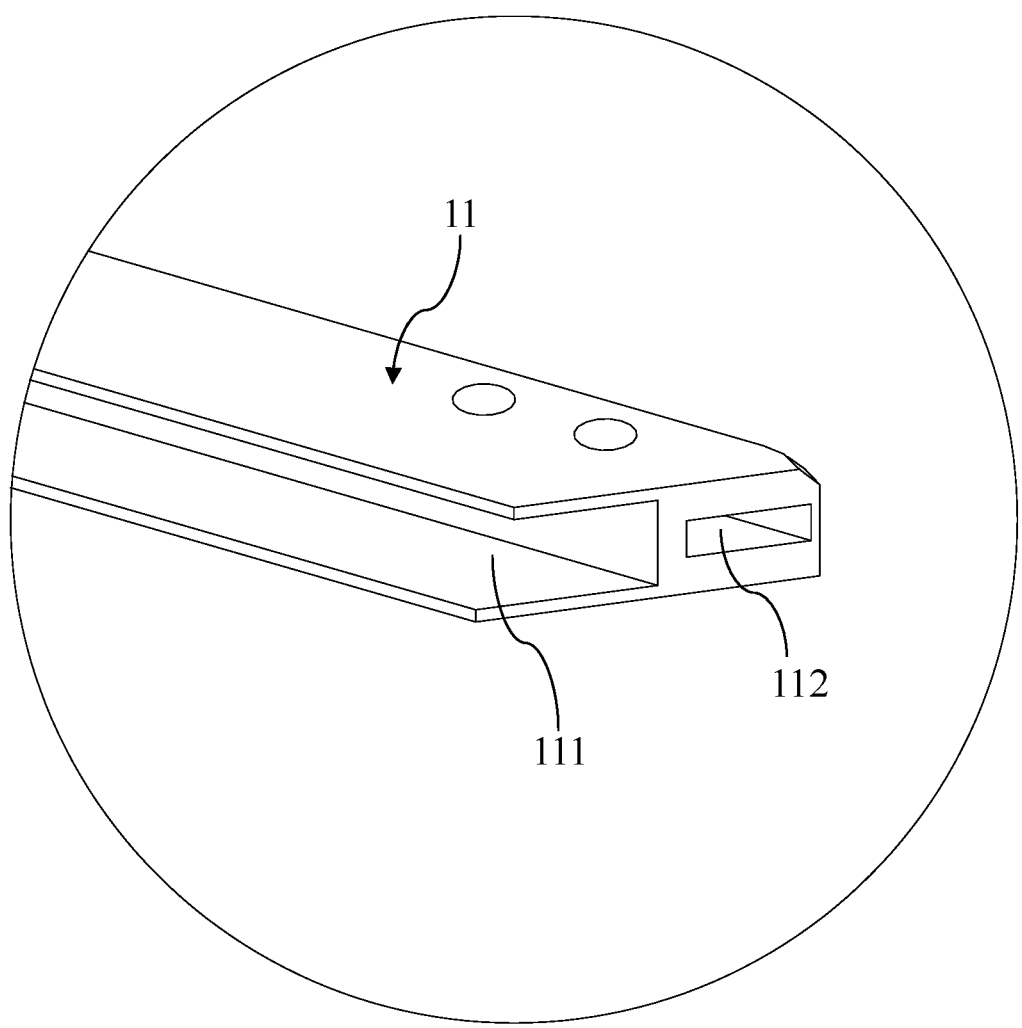
FIG. 6 is a partial enlarged view of a frame bar.

Preferably, as shown in FIG. 5, the middle optical isolation element 3 comprises an upper reflective sheet 33 and a lower reflective sheet 34.

A reflective face of the upper reflective sheet 33 faces the upper light guiding plate 4, and a reflective face of the lower reflective sheet 34 faces the lower light guiding plate 5.

The upper reflective sheet 33 is used to diffuse the light from the upper lamp body 22 towards the upper light guiding plate 4 side, to increase the brightness of light emitted upwards. The lower reflective sheet 33 is used to diffuse the light from the lower lamp body 23 towards the lower light guiding plate 5 side, to increase the brightness of light emitted downwards.

Figure 7:
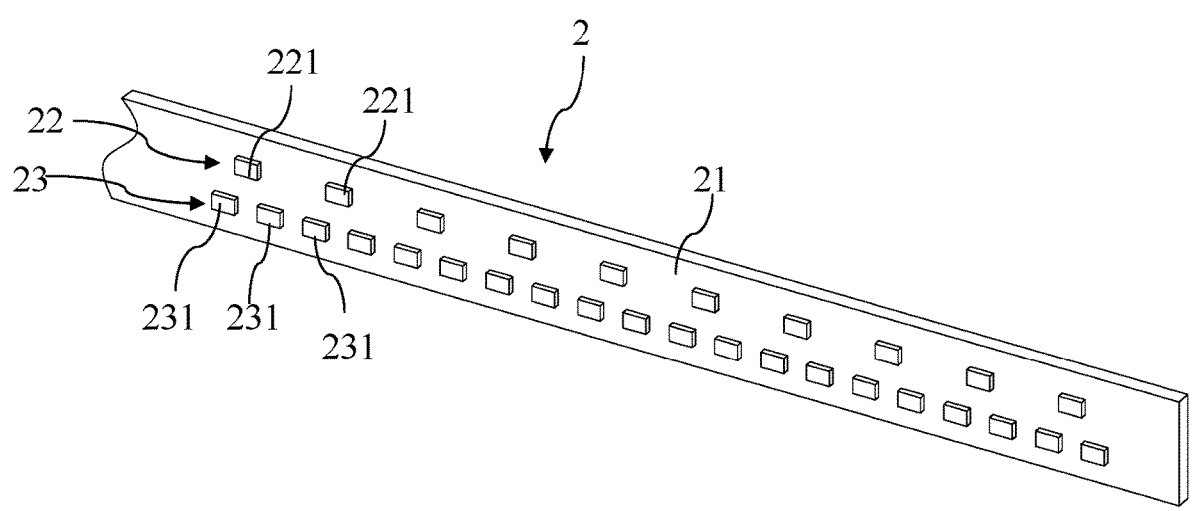
FIG. 7 is a partial enlarged view of a lamp bar.
Figure 8:
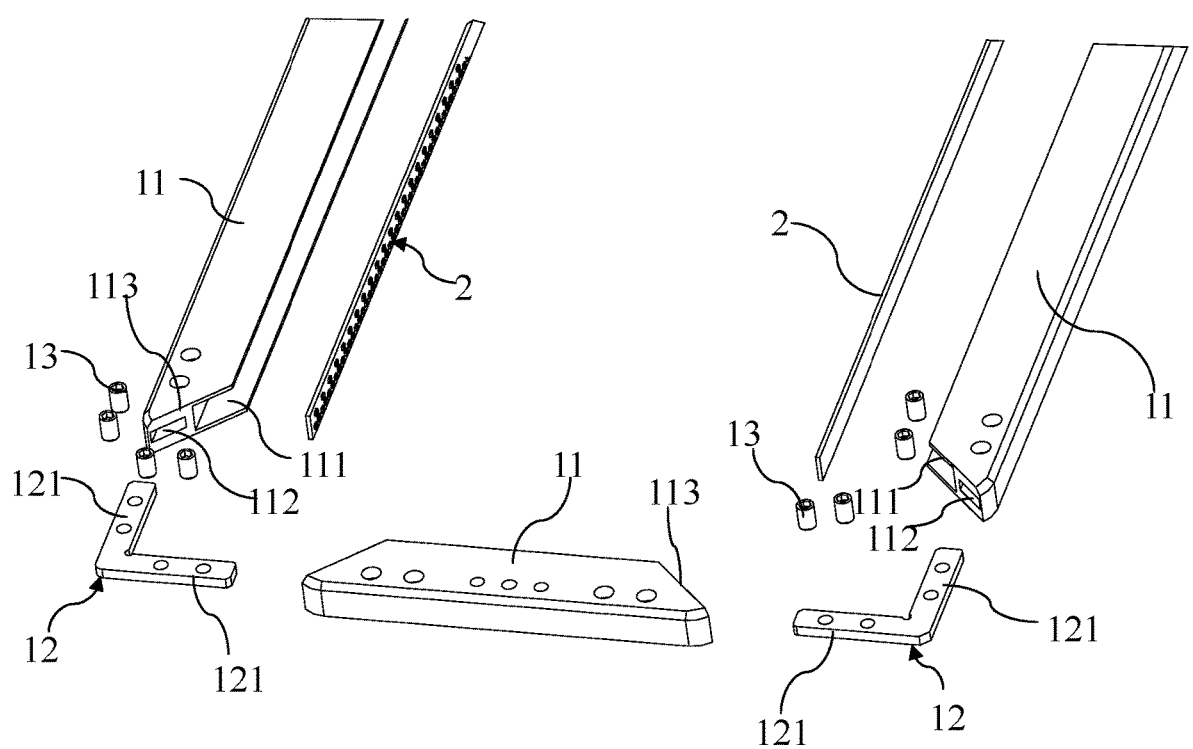
FIG. 8 is an explosive view of the frame bar to be connected by frame bar connections.

Preferably, as shown in FIG. 7, the lamp bar 2 comprises a circuit board 21. The upper lamp body 22 comprises a plurality of upper beads 221 arranged on the circuit board 21 at intervals, and the lower lamp body 23 comprises a plurality of lower beads 231 arranged on the circuit board 21 at intervals.

The upper and lower beads 221 and 231 both can be LED beads for power saving.

The upper and lower beads 221 and 231 are welded on the circuit board 21.

Each upper bead 221 faces the side edge of the upper light guiding plate 4, and can emit light towards the upper light guiding plate 4 through which the light is emitted out.

Each lower bead 231 faces the side edge of the lower light guiding plate 5, and can emit light towards the lower light guiding plate 5 through which the light is emitted out.

Preferably, as shown in FIG. 7, there is an upper bead separation distance between any two adjacent upper beads 221, and there is a lower bead separation distance between any two adjacent lower beads 231. Wherein, the upper bead separation distance is bigger than the lower bead separation distance.

And each upper bead 221 is located above the lower beads 231 along the height direction of the circuit board 21.

Each upper bead 221 is arranged between two adjacent lower beads 231 along the length direction of the circuit board 21.

On one hand, such arrangement facilitates the installation of the upper and lower beads 221 and 231. On the other hand, such arrangement makes it possible to adjust the illumination brightness on upper and lower sides.

Figure 10:
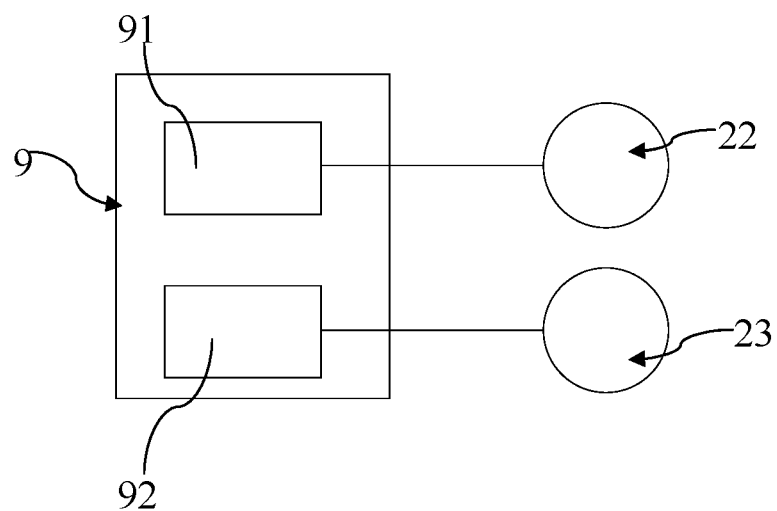
FIG. 10 is a schematic diagram of a control unit being electrically connected to an upper lamp body and a lower lamp body.
Figure 11:
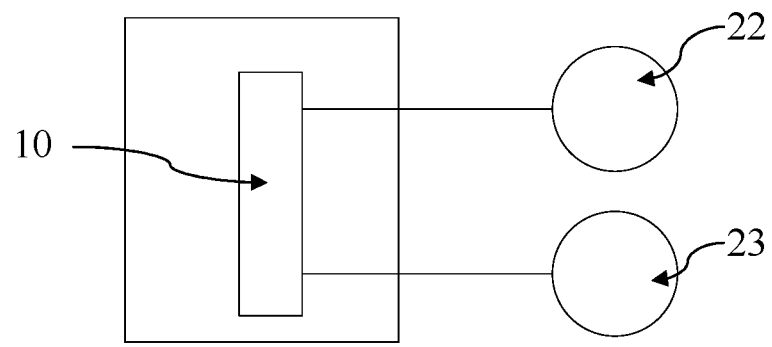
FIG. 11 is a schematic diagram of a color temperature controller being electrically connected to the upper lamp body and the lower lamp body.

Preferably, as shown in FIG. 10, the panel lamp further comprises a control unit 9, which comprises an upper lamp body control unit 91 for controlling on-off of the upper lamp body 22 and a lower lamp body control unit 92 for controlling on-off of the lower lamp body 23.

The upper lamp body control unit 91 is electrically connected to the upper lamp body 22, and the lower lamp body control unit 92 is electrically connected to the lower lamp body 23.

On-off of the upper lamp body 22 is controlled by means of the upper lamp control unite 91, and on-off of the lower lamp body 23 is controlled by means of the lower lamp control unite 92. On-off of the upper lamp body 22 and on-off of the lower lamp body 23 can be controlled separately and independently, so as to achieve emitting light upwards and downwards separately or simultaneously.

Preferably, as shown in FIG. 10, the panel lamp further comprises a color temperature controller 10 electrically connected to the upper lamp body 22 and lower lamp body 23 respectively.

The color temperature controller 10 is used to control the color temperature of the upper and lower lamp bodies, such that different colors of light can be emitted to meet operating requirements in different scenarios.

Preferably, as shown in FIGS. 2-3, 5 and 8, two ends of each frame bar 11 both have a frame bar ramp 113, and the ends of each frame bar 11 having frame bar ramp 113 all have a frame bar connection groove 112.

Two adjacent frame bars 11 are connected by a frame bar connection element 12.

The frame bar connection element 12 comprises two connection element connection ends 121, one 121 being inserted into the frame bar connection groove 112 of one frame bar 11 and connected with this frame bar 11 by screws 13, the other 121 being inserted into the frame bar connection groove 112 of other frame bar 11 and connected with this frame bar 11 by the screws 13.

The frame bar ramps 113 of two adjacent frame bars 11 are butted together.

Two adjacent frame bars 11 can be secured together by L-shaped frame bar connection element 12 to form a desired lamp frame shape.

Figure 4:
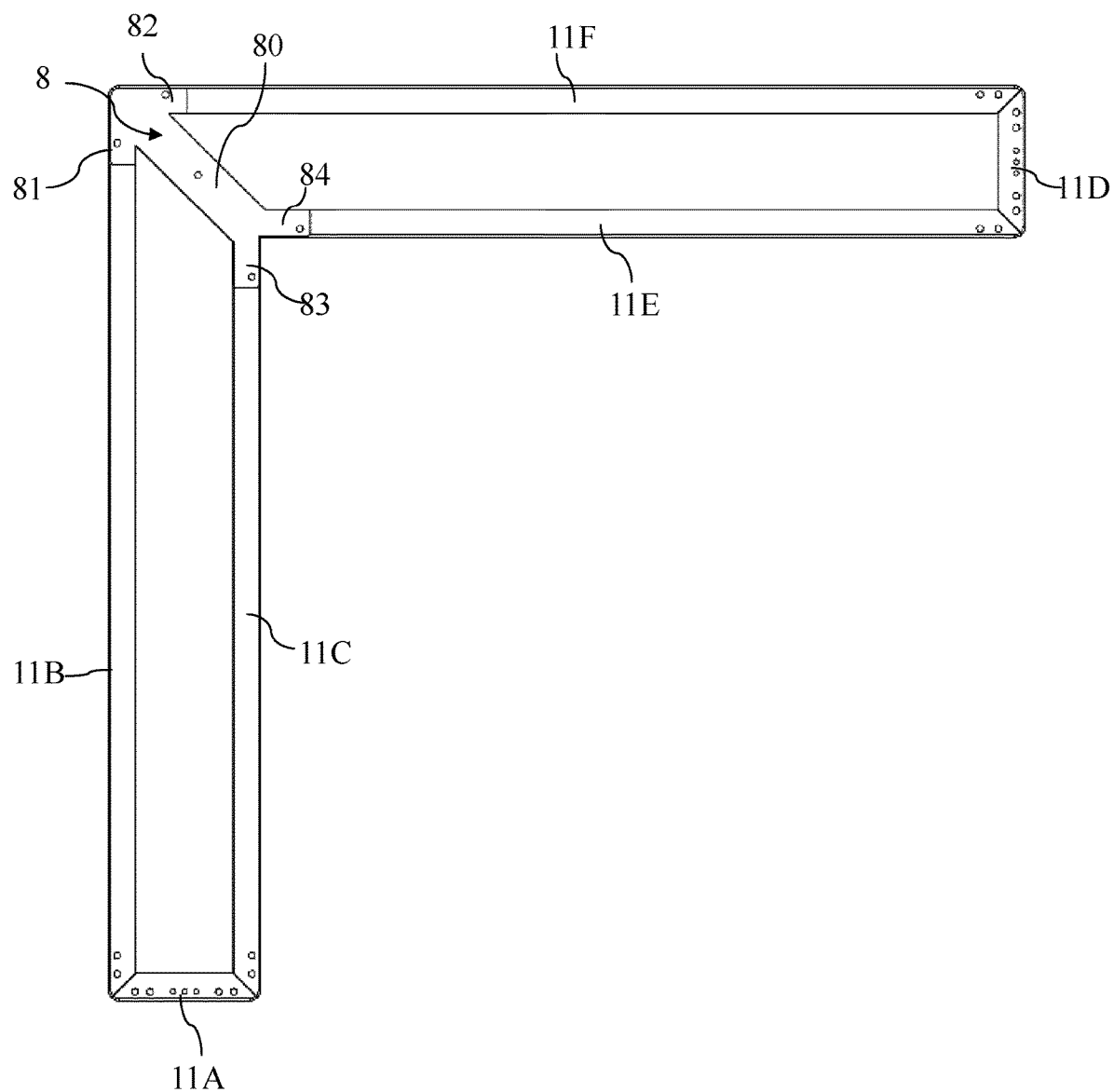
FIG. 4 is a perspective view of a panel lamp provided by a third embodiment of the invention.

Preferably, as shown in FIGS. 4-5, the lamp frame 1 is L-shaped, and comprises a first frame bar 11A, a second frame bar 11B, a third frame bar 11C, a fourth frame bar 11D, a fifth frame bar 11E and a sixth frame bar 11F.

The second frame bar 11B is parallel to the third frame bar 11C, with the first frame bar 11A connected between the second frame bar 11B and the third frame bar 11C.

Two ends of the first frame bar 11A are respectively connected to the second frame bar 11B and the third frame bar 11C by the frame bar connection elements 12.

The fifth frame bar 11E is parallel to the sixth frame bar 11F, with the fourth frame bar 11D connected between the fifth frame bar 11E and the sixth frame bar 11F.

Two ends of the fourth frame bar 11D are respectively connected to the fifth frame bar 11E and the sixth frame bar 11F by the frame bar connection elements 12.

The second frame bar 11B is connected to the sixth frame bar 11F by the frame bar connection element 12, and the third frame bar 11C is connected to the fifth frame bar 11E by the frame bar connection element 12.

The second frame bar 11B and the sixth frame bar 11F, and the third frame bar 11C and the fifth frame bar 11E are connected by a fastener 8.

A L-shaped structure can be formed by such arrangement that the first frame bar 11A, the second frame bar 11B, the third frame bar 11C are connected to form a rectangle with an opening, the fourth frame bar 11D, the fifth frame bar 11E and sixth frame bar 11F are connected to form a rectangle with an opening, and the second frame bar 11B is connected with the sixth frame bar 11F and the third frame bar 11C is connected with the fifth frame bar 11E.

And any two adjacent frame bars are connected by the frame bar connection element 12, which increases the stability at joints of the frame bars.

Then, the second frame bar 11B and the sixth frame bar 11F, and the third frame bar 11C and the fifth frame bar 11E are connected by the fastener 8, which increases the stability at a corner of the L-shaped structure.

Figure 9:
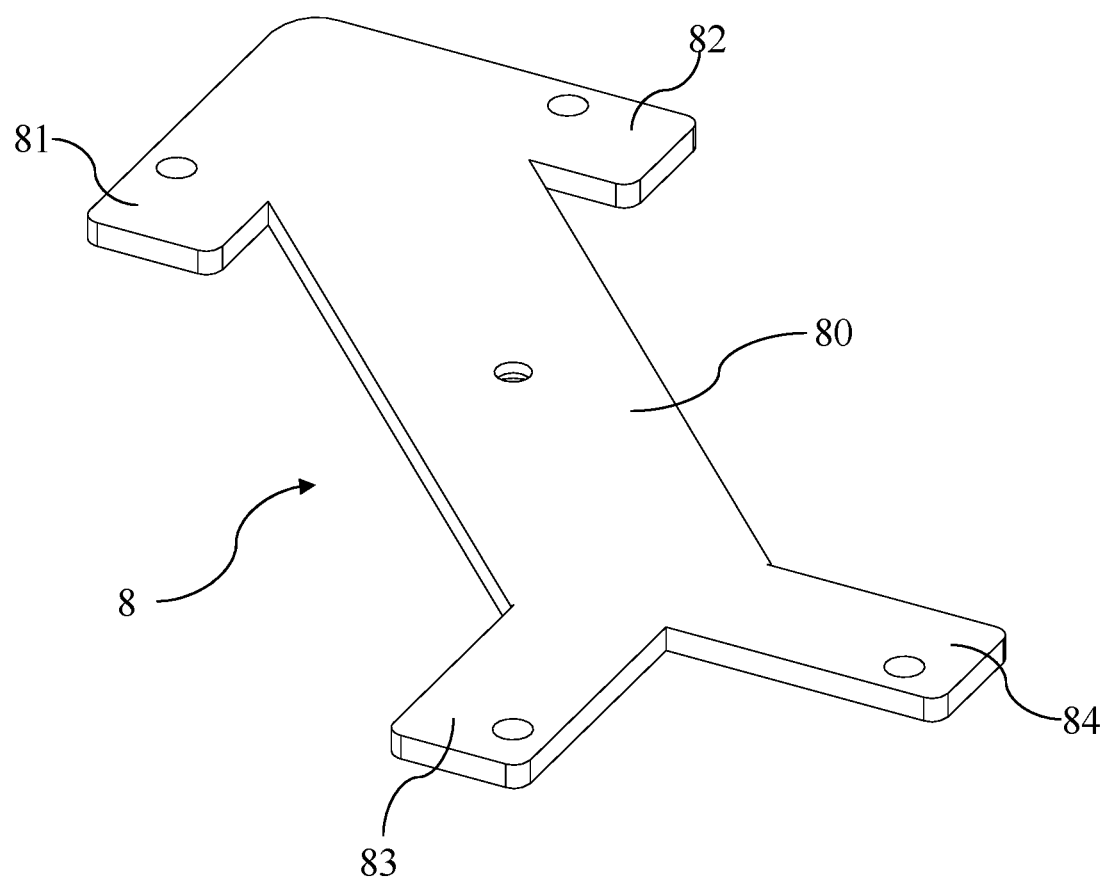
FIG. 9 is a perspective view of a fastener.

Preferably, as shown in FIGS. 4-5 and 9, the fastener 8 comprises a fastener body 80 capable of transmitting light. A first connection end 81 and a second connection end 81 are oppositely provided at an end of the fastener body 80, and a third connection end 83 and a fourth connection end 84 are oppositely provided at other end of the fastener body 80.

The first connection end 81 is parallel to the third connection end 83, and the second connection end 82 is parallel to the fourth connection end 84.

The first connection end 81 is connected with the second frame bar 11B, the third connection end 83 is connected with the third frame bar 11C, the second connection end 82 is connected with the sixth frame bar 11F, and the fourth connection end 84 is connected with the fifth frame bar 11E.

By connecting the fastener 8 at the corner of the L-shaped lamp frame 1, the connection stability at the corner is increased, and by configuring the fastener body 80 as a fastener body capable of transmitting light, the light diffused out by the upper diffusing plate 6 and/or the lower diffusing plate 7 will not be blocked by the fastener body.

The fastener body 80 is made from light-transmissive material, which may be a perspex or light-transmissive resin plate. The first connection end 81, the second connection end 82, the third connection end 83 and the fourth connection end 84 may also be of light-transmissive material, and be formed integrally with the fastener body 80.

The first connection end 81, the second connection end 82, the third connection end 83 and the fourth connection end 84 may also be plate materials, which are secured to the fastener body 80.

The first connection end 81, the second connection end 82, the third connection end 83 and the fourth connection end 84 are respectively connected with the frame bars by a fastening screw.

To sum up, the panel lamp provided in the invention can emit light upwards and downwards separately or simultaneously, can change brightness degree and color temperature, and can be applied to various places, facilitate installation and reduce the cost.

The foresaid individual technical solutions can be combined according to requirements, so as to achieve best technical effect.

What have been stated above are only principle and preferred embodiments of the present invention. It should be noted that, those skilled in the art can make various other modifications based on the principle of the present invention, all of which should be deemed to fall within the protection scope of the present invention.

Each frame bar 11 has an installation groove 111 on a side of the frame bar 11 facing the lamp frame installation space 10.

Each installation groove 111 is internally provided with one lamp bar 2.

An upper lamp body 22 and a lower lamp body 23 located below the upper lamp body 22 are provided on each lamp bar 2.

The upper light diffusing plate 6, the upper light guiding plate 4, the middle optical isolation element 3, the lower light guiding plate 5 and the lower light diffusing plate 7 are snap-fitted in the installation grooves 111.

The upper lamp body 22 faces a side edge of the upper light guiding plate 4, and the lower lamp body 23 faces a side edge of the lower light guiding plate 5.

The middle optical isolation element 3 is arranged between the upper lamp body 22 and the lower lamp body 23, and between the upper light guiding plate 4 and the lower light guiding plate 5.

The upper light diffusing plate 6 is located above the upper light guiding plate 4, and the lower light diffusing plate 7 is located below the lower light guiding plate 5.

That is, the lamp frame 1 of the panel lamp is mainly consisted of more than three frame bars 11, and the central portion of the lamp frame 1 is the lamp frame installation space 10 for installing the light diffusing plates and the light guiding plates.

An inner side of each frame bar 11 has the installation groove 111, the groove opening of which faces the lamp frame installation space 10.

The lamp bars 2 are arranged in the installation grooves 111. The upper lamp body 22 and the lower lamp body 23 are provided on the lamp bars 2.

The panel lamp further comprises the middle optical isolation element 3, the upper light guiding plate 4, the lower light guiding plate 5, the upper light diffusing plate 6 and the lower light diffusing plate 7.

The light guiding plates are used to direct the light out of a light source. The light diffusing plates are used to diffuse the light to uniformly distribute the brightness of the light.

Peripheral edges of the middle optical isolation element 3, the upper light guiding plate 4, the lower light guiding plate 5, the upper light diffusing plate 6 and the lower light diffusing plate 7 are all embedded into the installation grooves 111.

Wherein, the middle optical isolation element 3 is arranged between the upper lamp body 22 and the lower lamp body 23 to separate the light of the upper lamp body 22 from the light of the lower lamp body 23.

The side edge of the upper light guiding plate 4 is aligned with the upper lamp body 22, that is, the upper lamp body 22 faces the upper light guiding plate 4, such that the light is directed out of the upper lamp body 22 through the upper light guiding plate 4. The upper light diffusing plate 6 is located above the upper light guiding plate 4 and is used to uniformly diffuse out the light conducted by the upper light guiding plate 4.

The side edge of the lower light guiding plate 5 is aligned with the lower lamp body 23, that is, the lower lamp body 23 faces the lower light guiding plate 5, such that the light is directed out of the lower lamp body 23 through the lower light guiding plate 5. The lower light diffusing plate 7 is located below the lower light guiding plate 5 and is used to uniformly diffuse out the light conducted by the lower light guiding plate 5.

Thus, in the panel lamp provided in the invention, the lamp bars 2 are provided with the upper lamp body 22 facing the side edge of the upper light guiding plate 4 and the lower lamp body 23 facing the side edge of the lower light guiding plate 5, and the middle optical isolation element 3 is arranged between the upper and lower light guiding plates, such that the panel lamp can emit light upwards and downwards separately or simultaneously, and can be applied to various places, facilitate installation, and reduce the cost.

Preferably, as shown in FIG. 3, the middle optical isolation element 3 comprises an upper partition 31 located on the side close to the upper light guiding plate 4 and a lower partition 32 located on the side close to the lower light guiding plate 5.

The upper partition 31 is used to block the light from the upper lamp body 22 and diffuse the light towards the upper light guiding plate 4 side. The lower partition 32 is used to block the light from the lower lamp body 23 and diffuse the light towards the lower light guiding plate 5 side.

Preferably, as shown in FIG. 5, the middle optical isolation element 3 comprises an upper reflective sheet 33 and a lower reflective sheet 34.

A reflective face of the upper reflective sheet 33 faces the upper light guiding plate 4, and a reflective face of the lower reflective sheet 34 faces the lower light guiding plate 5.

The upper reflective sheet 33 is used to diffuse the light from the upper lamp body 22 towards the upper light guiding plate 4 side, to increase the brightness of light emitted upwards. The lower reflective sheet 33 is used to diffuse the light from the lower lamp body 23 towards the lower light guiding plate 5 side, to increase the brightness of light emitted downwards.

Preferably, as shown in FIG. 7, the lamp bar 2 comprises a circuit board 21. The upper lamp body 22 comprises a plurality of upper beads 221 arranged on the circuit board 21 at intervals, and the lower lamp body 23 comprises a plurality of lower beads 231 arranged on the circuit board 21 at intervals.

The upper and lower beads 221 and 231 both can be LED beads for power saving.

The upper and lower beads 221 and 231 are welded on the circuit board 21.

Each upper bead 221 faces the side edge of the upper light guiding plate 4, and can emit light towards the upper light guiding plate 4 through which the light is emitted out.

Each lower bead 231 faces the side edge of the lower light guiding plate 5, and can emit light towards the lower light guiding plate 5 through which the light is emitted out.

Preferably, as shown in FIG. 7, there is an upper bead separation distance between any two adjacent upper beads 221, and there is a lower bead separation distance between any two adjacent lower beads 231. Wherein, the upper bead separation distance is bigger than the lower bead separation distance.

And each upper bead 221 is located above the lower beads 231 along the height direction of the circuit board 21.

Each upper bead 221 is arranged between two adjacent lower beads 231 along the length direction of the circuit board 21.

On one hand, such arrangement facilitates the installation of the upper and lower beads 221 and 231. On the other hand, such arrangement makes it possible to adjust the illumination brightness on upper and lower sides.

Preferably, as shown in FIG. 10, the panel lamp further comprises a control unit 9, which comprises an upper lamp body control unit 91 for controlling on-off of the upper lamp body 22 and a lower lamp body control unit 92 for controlling on-off of the lower lamp body 23.

The upper lamp body control unit 91 is electrically connected to the upper lamp body 22, and the lower lamp body control unit 92 is electrically connected to the lower lamp body 23.

On-off of the upper lamp body 22 is controlled by means of the upper lamp control unite 91, and on-off of the lower lamp body 23 is controlled by means of the lower lamp control unite 92. On-off of the upper lamp body 22 and on-off of the lower lamp body 23 can be controlled separately and independently, so as to achieve emitting light upwards and downwards separately or simultaneously.

Preferably, as shown in FIG. 10, the panel lamp further comprises a color temperature controller 10 electrically connected to the upper lamp body 22 and lower lamp body 23 respectively.

The color temperature controller 10 is used to control the color temperature of the upper and lower lamp bodies, such that different colors of light can be emitted to meet operating requirements in different scenarios.

Preferably, as shown in FIGS. 2-3, 5 and 8, two ends of each frame bar 11 both have a frame bar ramp 113, and the ends of each frame bar 11 having frame bar ramp 113 all have a frame bar connection groove 112.

Two adjacent frame bars 11 are connected by a frame bar connection element 12.

The frame bar connection element 12 comprises two connection element connection ends 121, one 121 being inserted into the frame bar connection groove 112 of one frame bar 11 and connected with this frame bar 11 by screws 13, the other 121 being inserted into the frame bar connection groove 112 of other frame bar 11 and connected with this frame bar 11 by the screws 13.

The frame bar ramps 113 of two adjacent frame bars 11 are butted together.

Two adjacent frame bars 11 can be secured together by L-shaped frame bar connection element 12 to form a desired lamp frame shape.

Preferably, as shown in FIGS. 4-5, the lamp frame 1 is L-shaped, and comprises a first frame bar 11A, a second frame bar 11B, a third frame bar 11C, a fourth frame bar 11D, a fifth frame bar 11E and a sixth frame bar 11F.

The second frame bar 11B is parallel to the third frame bar 11C, with the first frame bar 11A connected between the second frame bar 11B and the third frame bar 11C.

Two ends of the first frame bar 11A are respectively connected to the second frame bar 11B and the third frame bar 11C by the frame bar connection elements 12.

The fifth frame bar 11E is parallel to the sixth frame bar 11F, with the fourth frame bar 11D connected between the fifth frame bar 11E and the sixth frame bar 11F.

Two ends of the fourth frame bar 11D are respectively connected to the fifth frame bar 11E and the sixth frame bar 11F by the frame bar connection elements 12.

The second frame bar 11B is connected to the sixth frame bar 11F by the frame bar connection element 12, and the third frame bar 11C is connected to the fifth frame bar 11E by the frame bar connection element 12.

The second frame bar 11B and the sixth frame bar 11F, and the third frame bar 11C and the fifth frame bar 11E are connected by a fastener 8.

A L-shaped structure can be formed by such arrangement that the first frame bar 11A, the second frame bar 11B, the third frame bar 11C are connected to form a rectangle with an opening, the fourth frame bar 11D, the fifth frame bar 11E and sixth frame bar 11F are connected to form a rectangle with an opening, and the second frame bar 11B is connected with the sixth frame bar 11F and the third frame bar 11C is connected with the fifth frame bar 11E.

And any two adjacent frame bars are connected by the frame bar connection element 12, which increases the stability at joints of the frame bars.

Then, the second frame bar 11B and the sixth frame bar 11F, and the third frame bar 11C and the fifth frame bar 11E are connected by the fastener 8, which increases the stability at a corner of the L-shaped structure.

Preferably, as shown in FIGS. 4-5 and 9, the fastener 8 comprises a fastener body 80 capable of transmitting light. A first connection end 81 and a second connection end 81 are oppositely provided at an end of the fastener body 80, and a third connection end 83 and a fourth connection end 84 are oppositely provided at other end of the fastener body 80.

The first connection end 81 is parallel to the third connection end 83, and the second connection end 82 is parallel to the fourth connection end 84.

The first connection end 81 is connected with the second frame bar 11B, the third connection end 83 is connected with the third frame bar 11C, the second connection end 82 is connected with the sixth frame bar 11F, and the fourth connection end 84 is connected with the fifth frame bar 11E.

By connecting the fastener 8 at the corner of the L-shaped lamp frame 1, the connection stability at the corner is increased, and by configuring the fastener body 80 as a fastener body capable of transmitting light, the light diffused out by the upper diffusing plate 6 and/or the lower diffusing plate 7 will not be blocked by the fastener body.

The fastener body 80 is made from light-transmissive material, which may be a perspex or light-transmissive resin plate. The first connection end 81, the second connection end 82, the third connection end 83 and the fourth connection end 84 may also be of light-transmissive material, and be formed integrally with the fastener body 80.

The first connection end 81, the second connection end 82, the third connection end 83 and the fourth connection end 84 may also be plate materials, which are secured to the fastener body 80.

The first connection end 81, the second connection end 82, the third connection end 83 and the fourth connection end 84 are respectively connected with the frame bars by a fastening screw.

To sum up, the panel lamp provided in the invention can emit light upwards and downwards separately or simultaneously, can change brightness degree and color temperature, and can be applied to various places, facilitate installation and reduce the cost.

The foresaid individual technical solutions can be combined according to requirements, so as to achieve best technical effect.

What have been stated above are only principle and preferred embodiments of the present invention. It should be noted that, those skilled in the art can make various other modifications based on the principle of the present invention, all of which should be deemed to fall within the protection scope of the present invention.

What is claimed is:

1. A panel lamp comprising:
a lamp frame, lamp bars, an upper light diffusing plate, an upper light guiding plate, a lower light guiding plate, a lower light diffusing plate and a middle optical isolation element, wherein:
a lamp frame installation space is provided in a central portion of the lamp frame, and the lamp frame comprises at least three frame bars successively connected around the lamp frame installation space;
each frame bar has an installation groove on a side of the frame bar facing the lamp frame installation space;
each installation groove is internally arranged with one lamp bar;
an upper lamp body and a lower lamp body located below the upper lamp body are provided on each lamp bar;
the upper light diffusing plate, the upper light guiding plate, the middle optical isolation element, the lower light guiding plate and the lower light diffusing plate are snap-fitted in the installation grooves;
the upper lamp body faces a side edge of the upper light guiding plate, and the lower lamp body faces a side edge of the lower light guiding plate;
the middle optical isolation element is between the upper lamp body and the lower lamp body, and between the upper light guiding plate and the lower light guiding plate; and
the upper light diffusing plate is located above the upper light guiding plate, and the lower light diffusing plate is located below the lower light guiding plate;
two ends of each frame bar both have a frame bar ramp, and the ends of each frame bar having the frame bar ramp all have a frame bar connection groove;
two adjacent frame bars are connected by a frame bar connection element;
the frame bar connection element comprises two connection element connection ends, one of said two connection element connection ends being inserted into the frame bar connection groove of one frame bar and connected with this frame bar by screws, the other being inserted into the frame bar connection groove of the other frame bar and connected with this frame bar by the screws;
the frame bar ramps of two adjacent frame bars are butted together;
the lamp frame is L-shaped, and comprises a first frame bar, a second frame bar, a third frame bar, a fourth frame bar, a fifth frame bar and a sixth frame bar;
the second frame bar is parallel to the third frame bar, and the first frame bar is connected between the second frame bar and the third frame bar;

two ends of the first frame bar are respectively connected to the second frame bar and the third frame bar by the frame bar connection elements;

the fifth frame bar is parallel to the sixth frame bar, and the fourth frame bar is connected between the fifth frame bar and the sixth frame bar;

two ends of the fourth frame bar are respectively connected to the fifth frame bar and the sixth frame bar by the frame bar connection elements;

the second frame bar is connected to the sixth frame bar by the frame bar connection element, and the third frame bar is connected to the fifth frame bar by the frame bar connection element; and the second frame bar and the sixth frame bar, and the third frame bar and the fifth frame bar are connected by a fastener respectively;

the fastener comprises a fastener body capable of transmitting light, a first connection end and a second connection end are oppositely provided at an end of the fastener body, and a third connection end and a fourth connection end are oppositely provided at other end of the fastener body;

the first connection end is parallel to the third connection end, and the second connection end is parallel to the fourth connection end; and the first connection end is connected with the second frame bar, the third connection end is connected with the third frame bar, the second connection end is connected with the sixth frame bar, and the fourth connection end is connected with the fifth frame bar.

2. The panel lamp according to claim 1, wherein the middle optical isolation element comprises an upper partition located on a side close to the upper light guiding plate and a lower partition located on a side close to the lower light guiding plate.

3. The panel lamp according to claim 1, wherein:
the middle optical isolation element comprises an upper reflective sheet and a lower reflective sheet; and
a reflective face of the upper reflective sheet faces the upper light guiding plate, and a reflective face of the lower reflective sheet faces the lower light guiding plate.

4. The panel lamp according to claim 1, wherein:
the lamp bar comprises a circuit board;
the upper lamp body comprises a plurality of upper beads arranged on the circuit board at intervals; and
the lower lamp body comprises a plurality of lower beads arranged on the circuit board at intervals.

5. The panel lamp according to claim 4, wherein:
there is an upper bead separation distance between any two adjacent upper beads, and there is a lower bead separation distance between any two adjacent lower beads;
the upper bead separation distance is bigger than the lower bead separation distance;
each upper bead is located above the lower beads along the height direction of the circuit board; and
each upper bead is arranged between two adjacent lower beads along the length direction of the circuit board.

6. The panel lamp according to claim 1, wherein the panel lamp further comprises a control unit, which comprises an upper lamp body control unit for controlling on-off of the upper lamp body and a lower lamp body control unit for controlling on-off the lower lamp body; and
the upper lamp body control unit is electrically connected to the upper lamp body, and the lower lamp body control unit is electrically connected to the lower lamp body.

7. The panel lamp according to claim 6, wherein the panel lamp further comprises a color temperature controller electrically connected to the upper lamp body and lower lamp body respectively.

* * * * *